United States Patent [19]
Vossberg et al.

[11] Patent Number: 5,339,879
[45] Date of Patent: Aug. 23, 1994

[54] PNEUMATIC TIRE HAVING OPPOSITE SPIRAL ORIENTED BEADS

[75] Inventors: Stephen M. Vossberg, Uniontown; John D. Clothiaux, Hudson; Gregory D. Chaplin, Chippawa; Dale R. Harrigle, Jr., Akron, all of Ohio; Allen C. Kearney, Snow Hill; James A. Williams, Jr., Wilson, both of N.C.; Thomas S. Fleishchman, North Canton, Ohio

[73] Assignee: Bridgestone/Firestone, Inc., Akron, Ohio

[21] Appl. No.: 121,120

[22] Filed: Sep. 14, 1993

[51] Int. Cl.⁵ ............... B60C 15/04; B29D 30/48
[52] U.S. Cl. ................ 152/540; 152/154.1; 156/131; 245/1.5
[58] Field of Search ............ 152/539, 540, 154.1, 152/540; 156/75, 131, 136, 403; 245/1.5

[56] References Cited

U.S. PATENT DOCUMENTS

| | | |
|---|---|---|
| 1,503,985 | 8/1924 | Corson . |
| 3,170,662 | 2/1965 | Anderson ............... 245/1.5 |
| 3,656,532 | 4/1972 | Roberts . |
| 3,849,231 | 11/1974 | Brey et al. ............... 156/131 |
| 3,974,870 | 8/1976 | Watts . |
| 4,229,246 | 10/1980 | Vanderzee ............... 156/403 |
| 4,683,020 | 7/1987 | Portalupi et al. ............... 156/131 |
| 4,820,563 | 4/1989 | Rausch ............... 152/540 |
| 5,099,902 | 3/1992 | Shurman ............... 152/540 |
| 5,215,613 | 6/1993 | Shemenski et al. ............... 245/1.5 |

FOREIGN PATENT DOCUMENTS 1251403 12/1960 France ............... 152/540

*Primary Examiner*—Michael W. Ball
*Assistant Examiner*—Nancy T. Krawczyk
*Attorney, Agent, or Firm*—David A. Thomas

[57] ABSTRACT

A pneumatic tire having a tread, a pair of sidewalls each terminating in an annular bead area, and a pair of beads located within the bead areas, for mounting the tire on a rim. Each of the beads is formed by at least one strand of metallic wire wound upon itself into a spiral and terminating in inner and outer ends, which ends circumferentially overlap each other. The beads are placed in the tire so that the spiral orientation of the beads are opposite to each other and the inner ends of the beads are in substantial axial alignment to reduce radial force variations on the tire.

5 Claims, 3 Drawing Sheets

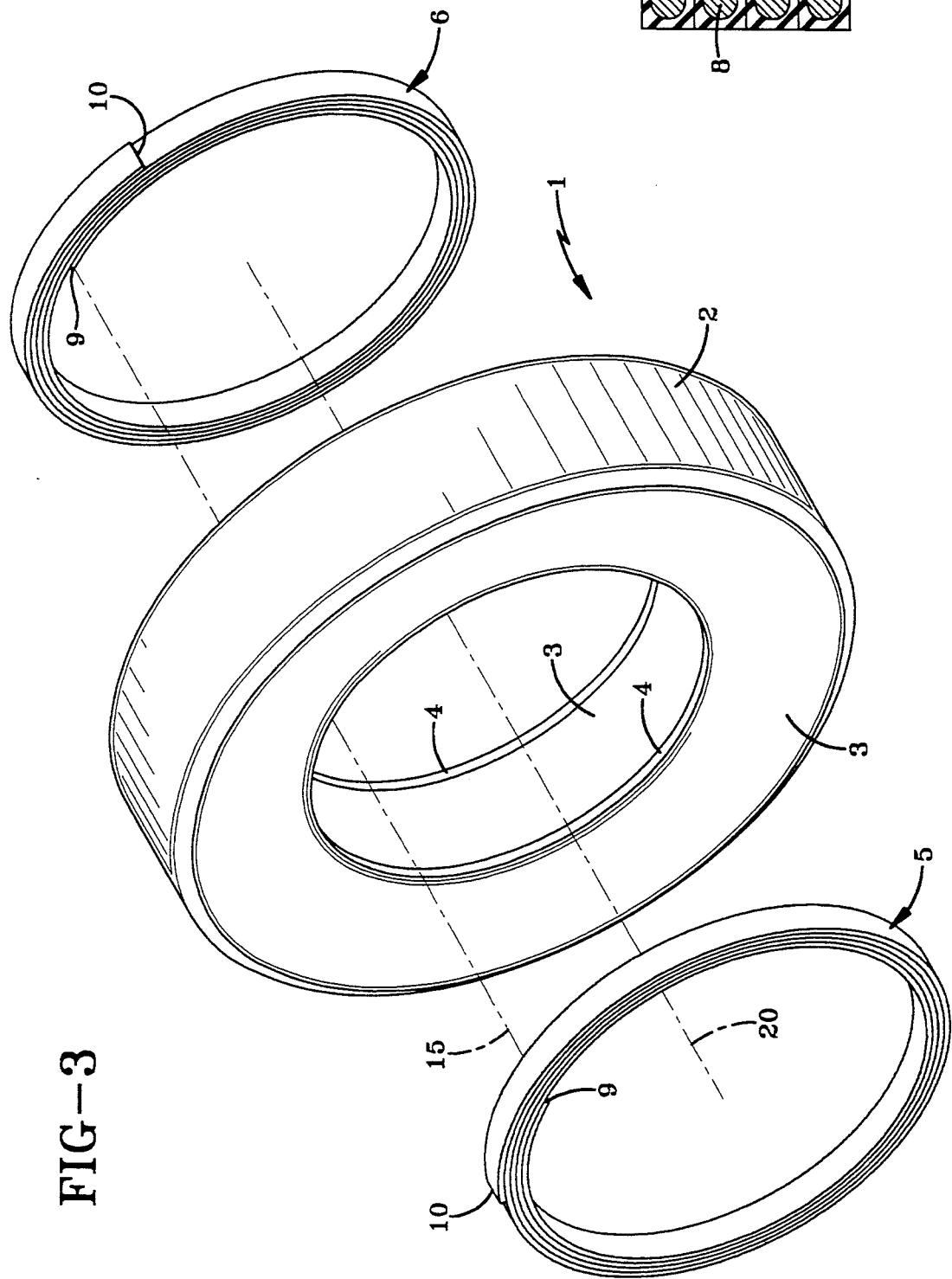
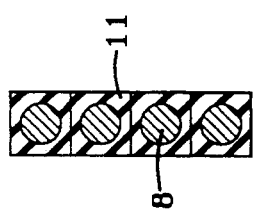
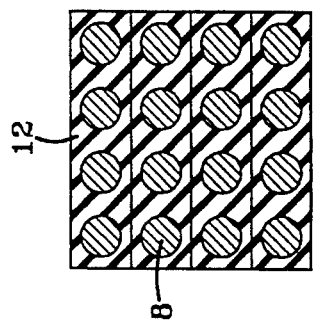

PNEUMATIC TIRE HAVING OPPOSITE SPIRAL ORIENTED BEADS

BACKGROUND OF THE INVENTION

1. Technical Field

The invention relates to pneumatic tires and in particular to the bead area thereof. More particularly, the invention relates to the orientation of the beads and the bead configuration in a tire in order to increase tire performance by reducing radial force variations on the tire. Even more particularly, the invention relates to a pneumatic tire in which the pair of beads are spirally wound and the inner circumferential ends of the beads are spotted together with the spirals being opposite to each other when mounted in the tire.

BACKGROUND INFORMATION

All tire manufacturers are striving to produce the most efficient and effective tire, one that will have long-wearing characteristics and the most satisfactory ride to the vehicle occupants. Any nonuniformity forces in a tire affects its efficiency and ride characteristics, and it is known that each component of a tire, including beads, contributes to subtle force variations in a rolling tire.

These force variations require scrapping of the tire if they become excessive or the grinding off cf certain portions of the tire to balance out the force variations, all of which are time consuming and increases the production costs of the tires.

Uniformity studies have revealed that the beads of a tire affect the radial force variation factors on the tire, especially when spotted box bead configurations are utilized. These box bead configurations usually consist of a plurality of individual strands of metal wire which are wound upon themselves into a spiral configuration, which are then placed in axial abutment in forming the final tire bead. The outer and inner ends in each of the individual strands in a single bead have been placed in axial alignment for ease of manufacture. However, it was not known that the direction of spiral of the opposed beads with respect to each other in a tire, materially effected various force variations.

Various prior art bead constructions and making of same are shown in the following U.S. patents.

U.S. Pat. No. 1,503,985 discloses a bead that is embedded in the bead portion of a tire casing, in which the bead is formed from a single continuous strip of sheet metal of spiral form with adjacent layers decreasing in their width, forming a substantially triangular-shaped bead.

U.S. Pat. No. 3,974,870 discloses a tire having different diameters for the annular beads to provide improved lateral stability.

U.S. Pat. No. 5,099,902 discloses a bead formed from a wound helical wire having an offset in the individual wire convolutions to increase tire uniformity.

U.S. Pat. No. 3,170,662 discloses a tire bead wherein the bead is formed from four wires that are helically arranged, with parallel wires being arranged in a coiled manner having multiple convolutions.

U.S. Pat. No. 3,656,532 discloses an asymmetric tire having beads of different diameters.

Although these prior art bead constructions and orientations discussed above may achieve their intended purpose, none of them are concerned with reducing radial force variation factors in a tire by the proper orientation of the beads with respect to each other in a tire.

SUMMARY OF THE INVENTION

Objectives of the invention include providing an improved pneumatic tire construction having a pair of beads, each of which is formed by one or a plurality of spiral wound strands of metallic wire, in which the inner and outer ends of the spiral overlap each other circumferentially to provide strength to the tire, and which the inner wire ends of the opposed beads are spotted at the same angular position in the tire with respect to each other, and that the spiral bead orientations of the two beads are opposite with respect to each other, which arrangement has been found to reduce the radial force variations in the final tire.

Another objective is to provide such a pneumatic tire construction in which the metallic strands of the beads are encased in rubber, and preferably have a round cross-sectional configuration.

Another objective of the tire construction and in particular the beads therefor, is that the inner and outer ends of each of the beads overlap approximately the same amount, which is in the range of from three inches to five inches for the majority of passenger tire sizes.

Another objective is to provide such a tire construction in which the proper orientation of the beads increases the uniformity of the tire without additional expenditures of material cost and manufacturing procedures, and which achieves the stated objectives in a simple, efficient and effective manner.

These objectives and advantages are obtained by the improved pneumatic tire construction of the invention, which tire comprises a tread, a pair of sidewalls, each terminating in an annular bead area for mounting the tire on a rim, and first and second annular beads, each contained within a respective one of the bead areas and being coaxially spaced with respect to an axial centerline of said tire, each of said beads including at least a single strand of metallic wire wound upon itself into a spiral and terminating in an outer end located on an outer circumference of the spiral and an inner end located on an inner circumference of the spiral; said inner and outer ends of each strand terminating in a circumferentially overlapped relationship, with the inner end of the first bead being in substantial axial alignment with the inner end of the second bead, and with the spiral orientation of the first bead being opposite to the spiral orientation of the second bead.

BRIEF DESCRIPTION OF THE DRAWING

The preferred embodiment of the invention, illustrative of the best mode in which applicants have contemplated applying the principles, is set forth in the following description and shown in the drawings and is particularly and distinctly pointed out and set forth in the appended claims.

FIG. 3 is a perspective view similar to FIG. 2 showing the two beads in exaggerated size in proper orientation on opposite sides of a pneumatic tire;

FIG. 5 is an enlarged cross-sectional view taken on line 5—5 FIG. 1; and

FIG. 6 is a cross sectional view similar to FIG. 5 taken on line 6—6, FIG. 2.

Similar numerals refer to similar parts throughout the drawings.

DESCRIPTION OF THE PREFERRED EMBODIMENT

A pneumatic tire indicated generally at 1, is shown in an exploded condition in FIG. 3. Tire 1 has a usual tread 2 and a pair of sidewalls 3 which terminate in a pair of bead areas 4 in which beads 5 and 6 are mounted in a usual manufacturing procedure. Beads 5 and 6 are similar in construction and thus only one is shown in detail in FIGS. 1, 5 and 6.

Figure 1:
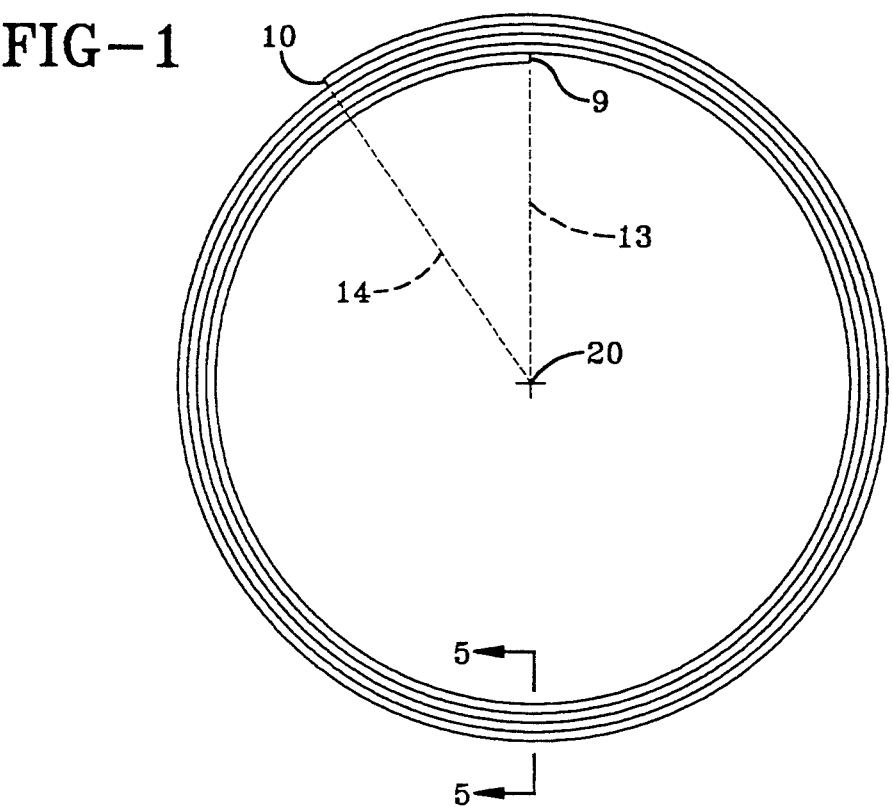
FIG. 1 is a nonproportional exaggerated plan view of a single spiral tire bead looking in the axial direction.
Figure 2:
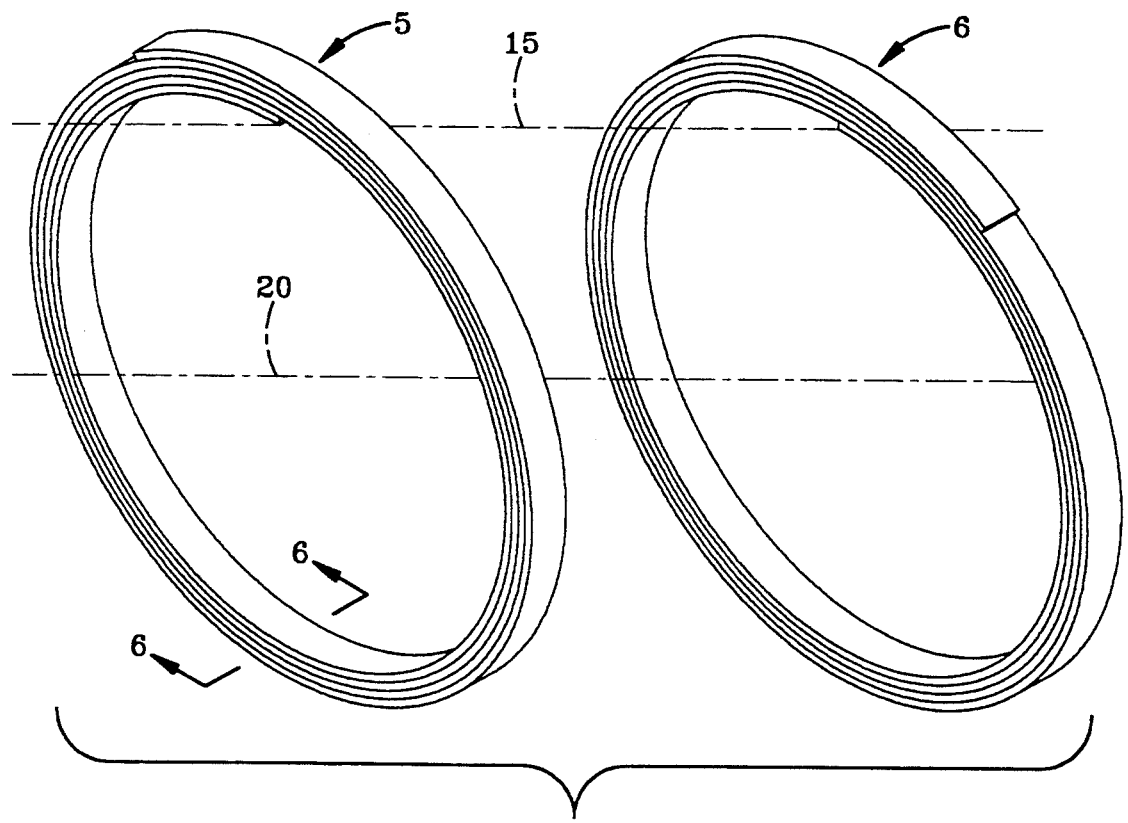
FIG. 2 is a perspective view of two beads, each formed by a plurality of the single spiral bead strand of FIG. 1, in proper orientation prior to mounting within a tire.

Each bead consists of one wire strand 8 as shown in FIGS. 1 and 5 or a plurality of individual wire strands 8 as shown in FIGS. 2, 3 and 6, each of which is wound into a spiral. Each strand 8 terminates in an inner end 9 and an outer end 10, which lie on the inner and outer circumferences, respectively, of the spiral strand. As shown in FIGS. 5 and 6, each strand preferably has a round cross-sectional configuration and is embedded in a thin layer of rubber 11. In most tire constructions, beads 5 and 6 will consist of a plurality of identical individual strands 8 which are placed in axial abutment, as shown in FIG. 6, which are also encased within rubber 12. As shown in FIGS. 2 and 3, the inner and outer ends of each individual strand 8 will lie in axial alignment with the inner and outer ends of the other strands, with the spirals of each of the strands extending in the same direction to provide a uniform bead 5, 6.

It has been discovered that the orientation of beads 5 and 6 with respect to each other when mounted in a pneumatic tire as shown particularly in FIGS. 2 and 3 is critical. In accordance with the invention, inner ends 9 of opposite beads are spotted at the same angular position in the tire as shown by imaginary axial line 15. In the individual strands 8, inner and outer ends 9 and 10 overlap circumferentially, as is the usual practice when making beads in order to increase the strength of the beads, as shown by radial lines 13 and 14 in FIG. 1. The amount of overlap will generally be the same in each bead. Ends 9 and 10 preferably have a range of overlap between three inches and five inches for most passenger tires in the 13, 14 and 15 inch size. However, in accordance with the invention, as shown in FIGS. 2 and 3, inner ends 9 of the beads 5 and 6 are spotted when placed in the tire, at the same angular position in the tire as shown by imaginary line 15.

Also in accordance with the invention, it has been discovered that mounting of the beads so that beads 5 and 6 are spiralled opposite with respect to each other, as shown in FIGS. 2 and 3, in combination with the spotting of the inner ends of the beads at the same angular position, achieves the most optimum reduction in radial force variations. As shown in FIGS. 2 and 3, bead 5 is placed in tire 1 so that strands 8 are wound in a counterclockwise direction, wherein the strands of bead 6 are wound in a clockwise direction, again with inner ends 9 lying on the same imaginary axially extending line extending therebetween, which line is parallel with the central axis 20 of the tire.

Figure 4:
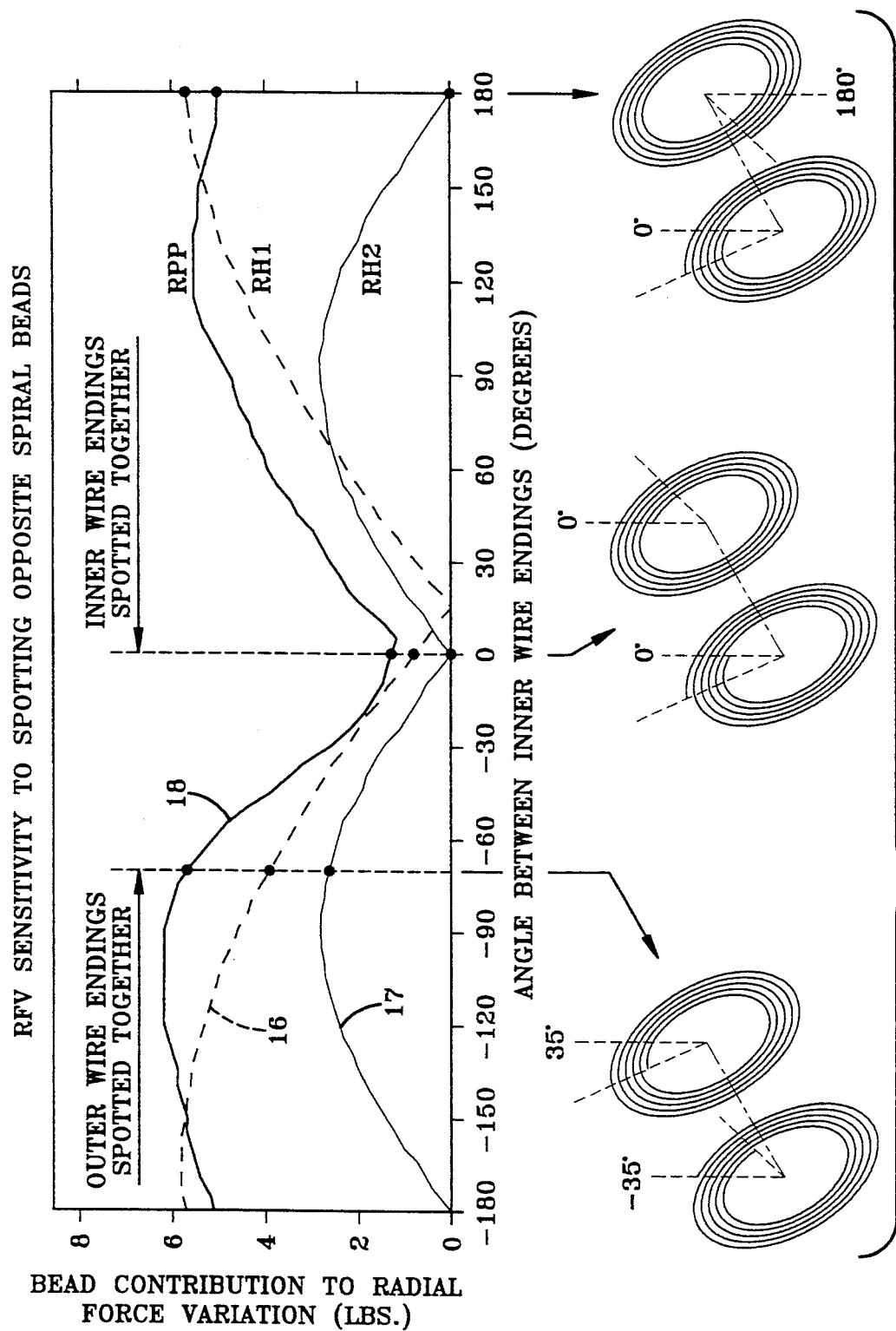
FIG. 4 is a graph showing the radial force variation sensitivity to the spotting of the inner ends of the beads when placed in opposite spiral arrangement.

FIG. 4 is a graph showing the radial force variation (RFV) sensitivity to the spotting of the inner ends on opposite spiral beads. Dashed line 16 marked RH1, indicates the first radial harmonic produced by a tire as the spotting of the inner spiral ends 9 varies. Line 17, marked RH2, represents the second radial harmonic, and Line 18, marked RPP, represents the radial force peak-to-peak. As clearly shown, the spotting of the inner ends of the opposite spiralled beads provides the best RFV sensitivity to the tire. Whereas, if the inner ends are not oriented with respect to each other as shown by the left and righthand end bead orientations of FIG. 4, the RH1 factor increases considerably, as well as the RPP factor. Even though the RH2 factor decreases in certain angular relationships, the overall decrease in RFV occurs when the inner ends are in angular alignment and the beads are in opposing spiral orientation.

Tests have shown that opposing spirals alone or that proper spotting of the inner ends alone, delivers no substantial benefit. It is only when the two beads have opposite spirals and the inner ends are in substantial axial alignment that the most effective results are achieved. Tests have also shown that spotting even of oppositely mounted beads with respect to the outer end does not achieve the same or best results as achieved by the spotting of the inner ends of the opposite spiral bead orientation, as shown in the center orientation of FIG. 4.

The bead configuration shown in FIGS. 5 and 6 sometimes referred to in the tire industry as a box bead,. However, the increased efficiency achieved by the present invention can also be achieved with certain beads, often referred to as programmed beads, wherein each bead is formed by a single continuous strand wound repeatedly into a spiral configuration, again terminating in inner and outer ends.

Accordingly, the improved pneumatic tire construction is simplified, provides an effective, safe, inexpensive, and efficient construction which achieves all the enumerated objectives, provides for eliminating difficulties encountered with prior tires, and solve problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved pneumatic tire is constructed and used, the characteristics of the construction, and the advantageous, new and useful results obtained; the new and useful structures, devices, elements, arrangements, parts and combinations, are set forth in the appended claims.

We claim:

1. In a pneumatic tire construction comprising a tread, a pair of sidewalls, each terminating in an annular bead area for mounting the tire on a rim, and first and second annular beads, each contained within a respective one of the bead areas and being coaxially spaced with respect to an axial centerline of said tire, each of said beads including at least a single strand of metallic wire wound upon itself into a spiral and terminating in an outer end located on an outer circumference of the spiral and an inner end located on an inner circumference of spiral; said inner and outer ends of each strand terminating in a circumferential overlapped relationship, with the inner end of the first bead being in substantial axial alignment with the inner end of the second bead, and with the spiral orientation of the first bead being opposite to the spiral orientation of the second bead.

2. The pneumatic tire construction defined in claim 1 in which the inner and outer ends of each of said strands circumferentially overlap; and in which the amount of overlap in both beads are substantially equal to each other.

3. The pneumatic tire construction defined in claim 1 in which the strand of metallic wire is embedded in rubber.

4. The pneumatic tire construction defined in claim 1 in which said first and second beads are further comprised of a plurality of individual strands of metallic wires lie in an axially side-by-side relationship, each of said strands being wound upon itself into a spiral and terminating in inner and outer ends; and in which said inner end and outer end of each strand are in axial alignment with the inner and outer ends of the other strands.

5. The pneumatic tire construction defined in claim 1 in which the strand of metallic wire is circular in cross section.

* * * * *